Patented Jan. 19, 1932

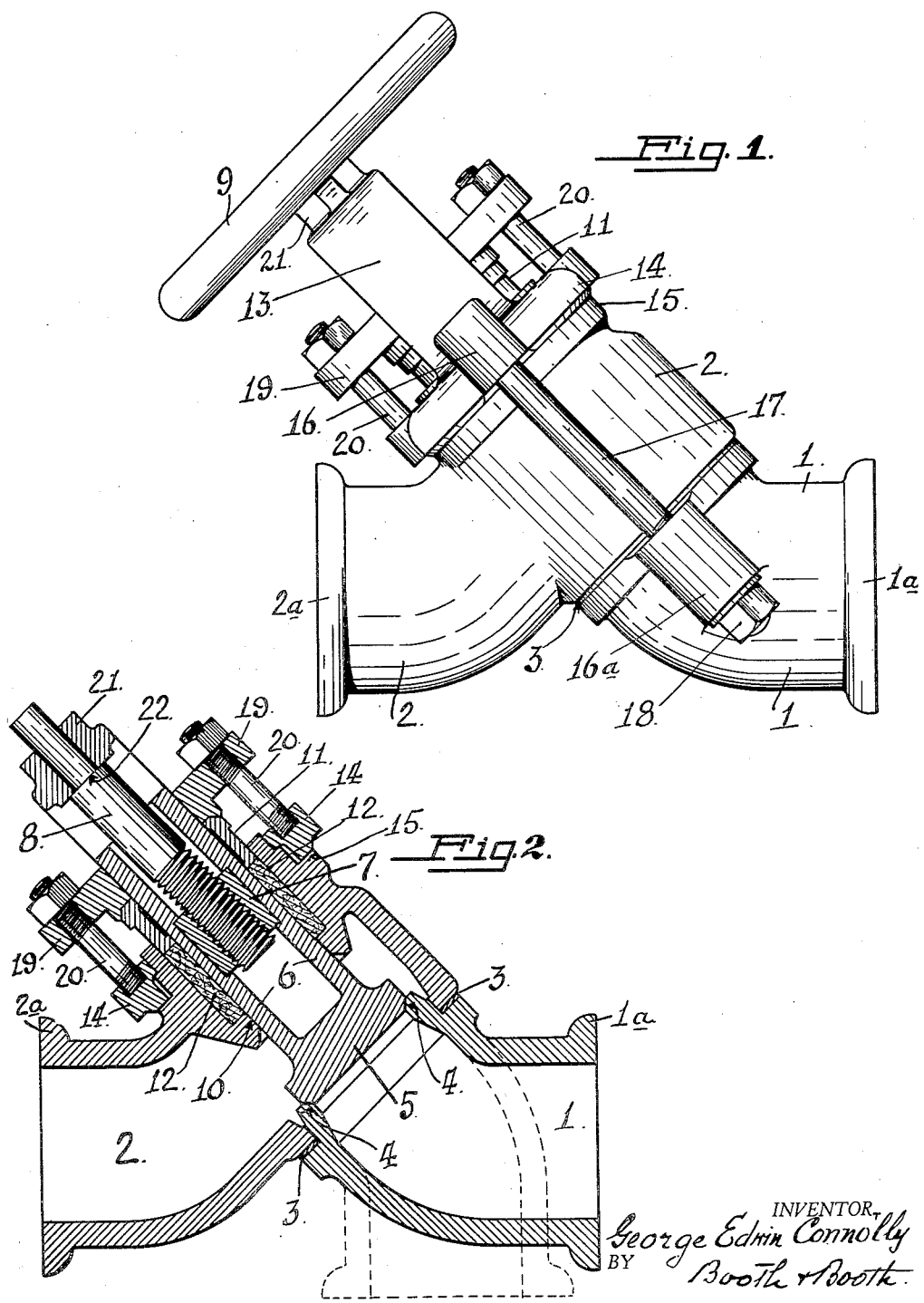

1,841,789

UNITED STATES PATENT OFFICE

GEORGE EDWIN CONNOLLY, OF OAKLAND, CALIFORNIA, ASSIGNOR TO PACIFIC FOUNDRY COMPANY, LTD., OF SAN FRANCISCO, CALIFORNIA, A CORPORATION OF CALIFORNIA

VALVE

Application filed April 28, 1930. Serial No. 447,974.

My invention relates, generally, to valves which by reason of their structural material and the assemblage of their members, are adapted for handling acids and other corrosive fluids.

In particular, it relates to that type of valve commonly known as a Y-valve, because of its angular fitting in the pipe line.

More specifically, my invention relates to that form of Y-valve in which the body is composed of complemental, separable sections meeting in a plane inclined to the direction of fluid flow through their meeting ends.

The object of my invention is to provide a valve for this purpose which, due to its structural assemblage is peculiarly adapted for corrosion resistance, and which when injuriously affected is subject to ready and inexpensive re-fit.

With such object in view, my invention is characterized, generally, by protecting the more corrodibly vulnerable parts from contact with the fluid as far as possible; and, specifically, by composing the body member of unequal complemental sections, the lesser one of which is provided with the valve-seat, whereby the discard of said section and the replacement of another may be done with minimum loss, especially when, as is contemplated, said lesser section is relatively simple and inexpensive as compared with the other section.

The nature of my invention and the manner in which its improvement is realized will hereinafter fully appear, reference being made to the accompanying drawings in which I have illustrated my valve in its preferred form, it being understood that changes may be made therein without departing from the spirit of the invention as defined by the claims hereunto appended.

In the drawings, Fig. 1 is a side elevation of my valve.

Fig. 2 is a longitudinal, center-line section of the same.

1 and 2 designate complemental sections of the valve-body, made of non-corrodible material, and each provided with an end flange 1a and 2a, respectively, indicating part of the means by which the body is adapted to be coupled in the pipe-line. These sections are relatively unequal, both in shape and length, though both are arcuate and arcuately meet in a plane inclined to the direction of fluid flow through their meeting ends. Section 1, the lesser section, is comparatively simple and inexpensive, while section 2, the greater section, is more highly specialized, and is shouldered upon and incloses the end of section 1, the joint between their ends being completed by a gasket 3. Section 1, the lesser section, in its shouldered meeting end is cast with an integral valve seat 4 with which a valve-member 5 coacts to control the communication between the body-sections 1 and 2. The valve-member 5 has a hollow stem 6, both valve-member and stem being of non-corrodible material. In the interior wall of said stem is a threaded zone comprising a nut 7, with which a threaded shank 8 of a hand wheel 9 engages, whereby, due to the rotation of said shank, the valve-member 5 is moved to and from its seat 4, the stem 6 of said valve-member being guided by an interior flange 10 within the body section 2, and further guided and protectively controlled by a gland 11 and packing 12. The nut 7, as also the screw shank 8, are of material not necessarily corrosive resisting, but are, by their position within the hollow stem, little subject to corrosion. 13 is a yoke which rests its foot ring 14 upon the shouldered top 15 of the body section 2. Aligned ears 16 and 16a on the yoke-foot 14 and the body section 1, respectively, receive bolts 17, with terminal nuts 18, said bolts detachably assembling and holding the yoke and the two body sections together. The gland 11 is tightened on its packing 12 by means of a follower ring 19 and bolts 20 engaging the foot ring 14 of the yoke 13.

The shank 8, which operates the valve-member 5, passes its upper end rotatably through the head 21 of the yoke 13, and is prevented from movement lengthwise by the hand-wheel 9 resting on the head of the yoke, and a shoulder 22 of said shank end bearing under said head.

Valves employed in controlling the passage of acids and other corrosive liquids and fluids are made as completely as possible of non-corrodible material; and the structure and assemblage of their members are of such a character as, first, to afford a measure of protection from contact with said fluids, and, second, to provide for ready dismemberment to remove corroded or injured parts and to replace them with fresh members with as little cost as possible.

In practice, it is apparent that the members most likely to suffer are the valve-member and its seat, especially the latter; and in the early state of the art, when the valve-seat was an integral part of a one-piece body, it was a matter of considerable expense to discard and replace this entire body member, usually a relatively costly one.

Advance in the art by making the body of separable, complemental sections and placing in their meeting plane a separate removable plate forming a valve-seat, while it had the advantage of withdrawing and replacing said seat-plate without dismembering the structure, or discarding an expensive unit, was not wholly desirable, since it added to the cost of manufacture.

It will now be seen that my invention in which the body is composed of separable, complemental, unequal sections, in the lesser of which the valve-seat is provided, it is not only possible to economically discard said lesser section, but also, gives opportunity to make said member comparatively simple and inexpensive, thus entailing a minimum of loss in discarding it and making it possible to re-fit the valve without replacement of an expensive part.

It will also be seen that by casting the nut 7 in the interior wall of the hollow stem 6 of the valve-member 5 there is provided a threaded connection between the hand wheel shank 8 and said nut which is fully protected from fluids which the valve is to control. This valve by having its body made in separable sections enjoys the advantage of having its flanged members for pipe connection, a part of each separate section, thus making it unnecessary to scrap practically the entire valve should a flange member break. Also there is the further advantage in this type of two part body member meeting in an angular plane, of obtaining either a straight-way valve or an angle-valve by simply swinging the section which carries the valve-seat through an angle of 180 degrees. This is indicated by the dotted lines in Fig. 2.

I claim:—

1. A valve for the described purpose, comprising a body member composed of separable, complemental sections, meeting in a plane inclined to the direction of fluid flow through their meeting ends, one of said sections having formed integrally therewith a correspondingly inclined valve-seat; a yoke fitted upon the other of said sections; tie-bolts securing said yoke and sections together; a valve-member coacting with the valve-seat, having a hollow stem reciprocable through and guided within said other body section, said stem having upon its inner wall a threaded zone; a threaded shank rotatably mounted in the yoke and passing into the hollow stem of the valve-member and engaging the interior threaded zone thereof for operating said member; and a gland carried by the yoke for guiding the valve-stem.

2. A valve for the described purpose, comprising a body composed of separable, complemental, unequal, relatively rotatable sections of non-corrodible material, meeting in a plane inclined to the direction of fluid flow through their meeting ends, the lesser of said sections having integral therewith a correspondingly inclined valve-seat; a valve-member adapted to coact with said seat, said member having a hollow stem of non-corrodible material; a nut embedded in the inner wall of said stem; a yoke fitted upon the other of said body sections; bolts securing the yoke and sections together; a threaded shank rotatably mounted in the yoke and passing into the hollow stem of the valve-member, and engaging the interior nut thereof; and a gland carried by the yoke for guiding and packing said valve stem.

In testimony whereof I have signed my name to this specification.

GEORGE EDWIN CONNOLLY.